(12) United States Patent
Miyoshi et al.

(10) Patent No.: US 11,824,767 B2
(45) Date of Patent: Nov. 21, 2023

(54) COMMUNICATION SYSTEM AND METHOD OF VERIFYING CONTINUITY

(71) Applicant: Nippon Telegraph and Telephone Corporation, Tokyo (JP)

(72) Inventors: Yuki Miyoshi, Musashino (JP); Ichiro Kudo, Musashino (JP); Hiroshi Osawa, Musashino (JP); Hiroshi Suzuki, Musashino (JP); Takeaki Nishioka, Musashino (JP); Yuhei Hayashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 116 days.

(21) Appl. No.: 17/429,072

(22) PCT Filed: Jan. 23, 2020

(86) PCT No.: PCT/JP2020/002337
§ 371 (c)(1),
(2) Date: Aug. 6, 2021

(87) PCT Pub. No.: WO2020/162207
PCT Pub. Date: Aug. 13, 2020

(65) Prior Publication Data
US 2022/0131789 A1    Apr. 28, 2022

(30) Foreign Application Priority Data

Feb. 7, 2019 (JP) .................................. 2019-020597

(51) Int. Cl.
*H04L 45/00* (2022.01)
*H04L 45/302* (2022.01)
(52) U.S. Cl.
CPC ............ *H04L 45/306* (2013.01); *H04L 45/20* (2013.01)

(58) Field of Classification Search
CPC .............................. H04L 45/20; H04L 45/306
See application file for complete search history.

(56) References Cited

U.S. PATENT DOCUMENTS

| 2009/0037713 A1 | 2/2009 | Khalid et al. |
| 2018/0131590 A1 | 5/2018 | Penno et al. |
| 2021/0219356 A1* | 7/2021 | Zahemszky ....... H04W 12/0433 |

FOREIGN PATENT DOCUMENTS

JP    2016225877    12/2016

OTHER PUBLICATIONS

Halpern et al., "Service Function Chaining (SFC) Architecture," Internet Engineering Task Force (IETF) Request for Comments, Oct. 2015, retrieved from URL <https://tools.ietf.org/html/rfc7665>, 7665:1-32.

(Continued)

*Primary Examiner* — Mansour Oveissi
(74) *Attorney, Agent, or Firm* — Fish & Richardson P.C.

(57) ABSTRACT

A continuity checking apparatus generates a continuity checking packet to which a predetermined flag and user attributes are assigned and transmits the generated continuity checking packet to an edge router connected to a service that is an entrance of a service chain. Each service transmits an arrival message with respect to the continuity checking packet to the continuity checking apparatus upon reception of the continuity checking packet to which the predetermined flag is assigned. In addition, each service transfers the continuity checking packet to a next service device of the service chain on the basis of the user attributes assigned to the received continuity checking packet. The continuity checking apparatus identifies a path representing service devices through which the continuity checking packet passes on the basis of the arrival message transmitted from each service, and determines whether the identified path is the (Continued)

same as a path of the service chain that is a continuity checking target.

4 Claims, 6 Drawing Sheets

(56) References Cited

OTHER PUBLICATIONS

Jiang et al., "Fault Management in Service Function Chaining, draft-jxc-sfc-fm-02.txt," Internet Working Group, Jul. 6, 2015, 13 pages.

Miyoshi et al., "Reachability Checking Method for Service Chaining Method Using BGP Flowspec and VRF," 2019 IEICE General Conference Lecture Proceedings Communication 2, Mar. 19, 2019, 5 pages (With English Translation).

Quinn et al., "Network Service Header (NSH)," Internet Engineering Task Force (IETF) Request for Comments, Jan. 2018, retrieved from URL, <https://tools.ietf.org/html/rfc8300>, 8300: 41 pages.

* cited by examiner

COMMUNICATION SYSTEM AND METHOD OF VERIFYING CONTINUITY

CROSS-REFERENCE TO RELATED APPLICATIONS

This application is a National Stage application under 35 U.S.C. § 371 of International Application No. PCT/JP2020/002337, having an International Filing Date of Jan. 23, 2020, which claims priority to Japanese Application Serial No. 2019-020597, filed on Feb. 7, 2019. The disclosure of the prior application is considered part of the disclosure of this application, and is incorporated in its entirety into this application.

TECHNICAL FIELD

The present invention relates to a communication system and a continuity checking method.

BACKGROUND ART

Conventionally, service chaining by which a function (service) necessary to use a virtualized computer network can be flexibly selected and set has been proposed.

When service chaining is performed through IP routing, an edge router connected to service groups that are targets of service chaining judges user attributes from received traffic and determines a service group to be used and a network path for connecting the service group in response to the judged user attributes. Accordingly, it is possible to realize service provision in response to the user attributes of the traffic.

In this service chaining, it is necessary to check whether each service is chained as intended by an operator through a continuity test or the like.

CITATION LIST

Non Patent Literature

[NPL 1] RFC7665 (Service Chaining), [retrieved on Jan. 25, 2019], Internet <URL: https://tools.ietf.org/html/rfc7665>
[NPL 2] RFC8300 (Network Service Header (NSH)), [retrieved on Jan. 25, 2019], Internet <URL: https://tools.ietf.org/html/rfc8300>

SUMMARY OF THE INVENTION

Technical Problem

Here, there is a problem that it is difficult to check whether each service is chained as intended by an operator through a conventional continuity test or the like in dynamically formed service chaining.

For example, a case in which a ping is performed for a continuity test of service chaining is conceivable. In this case, a continuity checking packet may be transmitted from an edge router to a final service in a service chain to check arrival of the packet at the final service, but it is impossible to check services through which the packet arrives at the final service (problem 1).

In addition, each service in a service chain is dynamically generated and deleted according to network function virtualization (NFV) technology. Accordingly, service information (an IP address and the like of each service) is also dynamically changed, and thus it is necessary to check the service information whenever the service information is changed in order to perform a continuity test (problem 2).

Further, although a dedicated protocol in which a dedicated network service header (NSH) is packaged in a continuity checking packet has been proposed to solve problems 1 and 2, a device in which the dedicated protocol is mounted needs to be used to generate a service chain (problem 3).

Accordingly, an object of the present invention is to solve the aforementioned problems and easily check whether each service is chained as intended by an operator in a dynamically formed service chain.

Means for Solving the Problem

To accomplish the object, the present invention provides a communication system including: one or more service devices constituting a service chain; and a continuity checking apparatus which performs continuity checking of services devices constituting the service chain, wherein the continuity checking apparatus includes: a packet generation unit which generates a continuity checking packet to which a predetermined flag and user attributes information of a user of the service chain that is a continuity checking target are assigned, and transmits the generated continuity checking packet to an edge router connected to a service device that is an entrance of the service chain; a message reception unit which receives information representing reception of the continuity checking packet from each service device constituting the service chain; and a determination unit which identifies a path representing service devices through which the continuity checking packet passes on the basis of the information representing reception of the continuity checking packet, transmitted from each service device, and determines whether the identified path is the same as a path of the service chain that is the continuity checking target, and the service device includes: a message transmission unit which, upon reception of a continuity checking packet to which a predetermined flag is assigned, transmits information representing reception of the continuity checking packet to the continuity checking apparatus; and a transfer unit which transfers the continuity checking packet to a next service device of the service chain on the basis of user attribute information assigned to the received continuity checking packet.

Effects of the Invention

According to the present invention, it is possible to easily check whether each service is chained as intended by an operator in a dynamically formed service chain.

DESCRIPTION OF EMBODIMENTS

Hereinafter, modes (embodiments) for embodying the present invention will be divided into a first embodiment and a second embodiment and described with reference to the drawings. The present invention is not limited to each embodiment which will be described below.

First Embodiment

Overview

Figure 1:
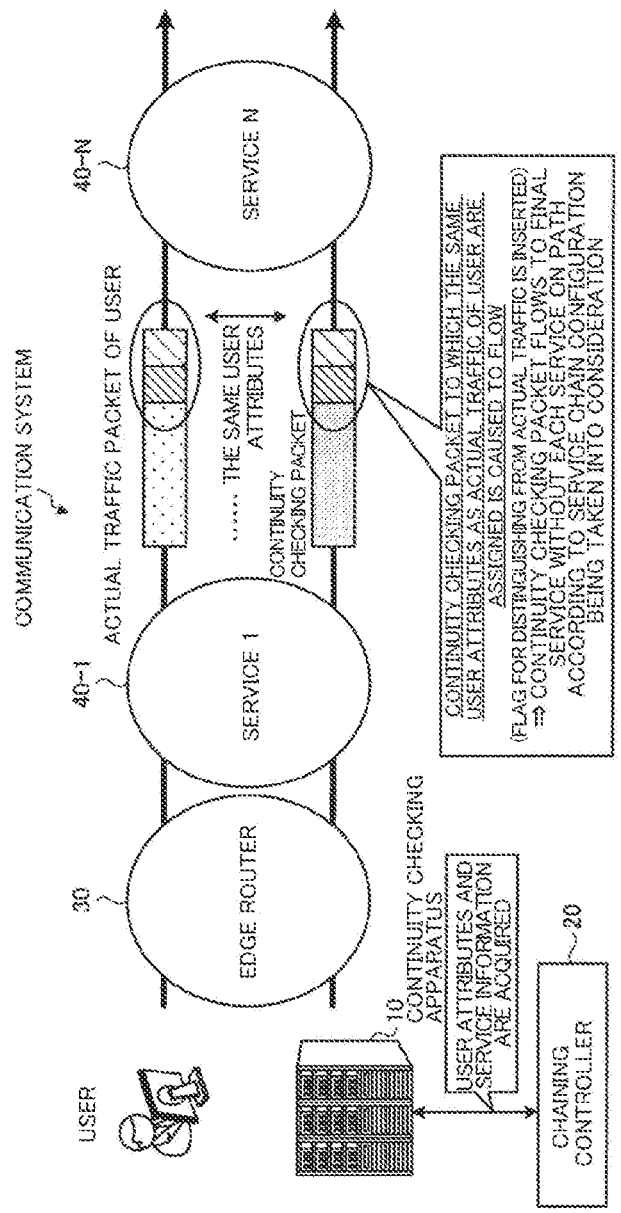
FIG. 1 is a diagram illustrating an overview of a communication system in a first embodiment.

First, an overview of a communication system of a first embodiment will be described using FIG. 1 and FIG. 2. As shown in FIG. 1, the communication system includes a continuity checking apparatus 10, a chaining controller 20, an edge router 30, and one or more services (service devices) 40 constituting a service chain. For example, the communication system includes N services 40 (services 40-1 to 40-N) and a service chain is composed of a combination of these services 40. The services 40 constituting the service chain are, for example, devices that provide an authentication service and a firewall function and are dynamically generated and deleted through the NFV technology.

The continuity checking apparatus 10 performs continuity checking of a service chain using a continuity checking packet to which a predetermined flag and user attributes of a user of the service chain that is a continuity checking target are assigned.

The chaining controller 20 stores various types of information about a service chain. For example, the chaining controller 20 may store information about a method of judging a user attribute of traffic and a service 40 applied to the traffic. For example, the chaining controller 20 stores user attributes (e.g., header information such as 5-tuple) of traffic that is a target of a service chain and identification information of services 40 constituting the service chain (service information) for each service chain.

The services 40 are devices (service devices) that provide functions (services) necessary for using a virtualized computer network in the service chain. Each service 40 includes a message transmission unit and a transfer unit (not shown). The message transmission unit transmits, when a continuity checking packet having a predetermined flag assigned thereto is received, the message for notification of reception of the continuity checking packet to the continuity checking apparatus 10. The transfer unit transfers the received continuity checking packet to the next service 40 of the service chain. Each service 40 is connected to the continuity checking apparatus 10, for example, via a predetermined monitoring network (refer to FIG. 2).

The edge router 30 is a router provided at the boundary between an external network (refer to FIG. 2) and the services 40. The edge router 30 acquires user attributes and service information from the chaining controller 20. Thereafter, the edge router 30 determines, on the basis of user attributes of a traffic packet received from an external network and the acquired user attributes and service information, a group of following services 40 through which the traffic packet will pass.

Then, the edge router 30 determines a network path through which the packet will pass through the group of following services 40. For example, upon reception of a packet, the edge router 30 determines a network path of the packet and transfers the packet to a service 40 that is an entrance of the network path (i.e., entrance of the corresponding service chain). Thereafter, the packet flows to the final service 40 of the service chain through the network path.

The continuity checking apparatus 10 acquires, from the chaining controller 20, user attributes (user attributes information) of a user of a service chain that is a continuity checking target, and service information (information representing services 40 constituting the service chain). Then, the continuity checking apparatus 10 causes a continuity checking packet to which the same user attributes as those of actual traffic of the user are assigned to flow from the edge router 30. Meanwhile, a flag for distinguishing the continuity checking packet from the actual traffic is inserted into this continuity checking packet. The continuity checking packet flows to the final service (e.g., service 40-N) without each service 40 on a path according to service chain configuration being taken into consideration. For example, the continuity checking packet transmitted from the continuity checking apparatus 10 to the edge router 30 may arrive at the service 40-1 to the service 40-N from the edge router 30.

Figure 2:
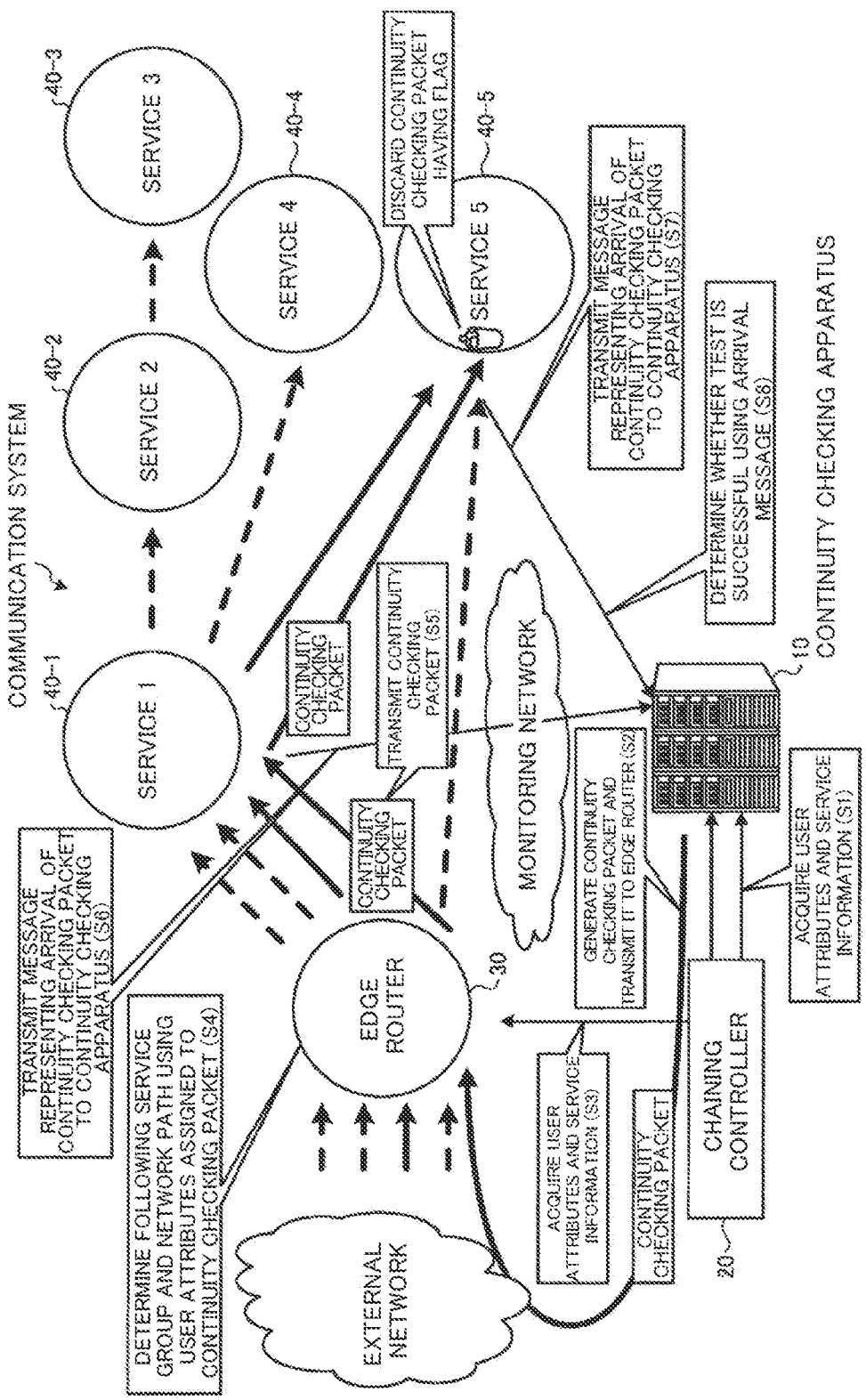
FIG. 2 is a diagram illustrating an operation example of the communication system in the first embodiment.

Here, an operation example of the communication system is described using FIG. 2. For example, the continuity checking apparatus 10 acquires user attributes and service information of a service chain that is a continuity checking target from the chaining controller 20 (S1). Thereafter, the continuity checking apparatus 10 generates a continuity checking packet to which a predetermined flag and the user attributes acquired in S1 are assigned and transmits the continuity checking packet to the edge router 30 (S2). In addition, the edge router 30 acquires the user attributes and the service information from the chaining controller 20 (S3). Thereafter, upon reception of the continuity checking packet, the edge router 30 determines a following service group and a network path using the information acquired in S3 and the user attributes assigned to the continuity checking packet (S4) and transmits the continuity checking packet to the initial service 40 (e.g., service 40-1) of the service group (S5).

After S5, each service 40 transfers the continuity checking packet having the flag assigned thereto to each following service 40 and transmits a message representing arrival of the continuity checking packet to the continuity checking apparatus 10.

For example, the service 40-1 transmits a message representing arrival of the continuity checking packet at the service 40-1 to the continuity checking apparatus 10 upon reception of the continuity checking packet (S6). Further, the service 40-5 transmits a message (arrival message) representing arrival of the continuity checking packet at the service 40-5 to the continuity checking apparatus 10 upon reception of the continuity checking packet transferred from the service 40-1 (S7). Meanwhile, the continuity checking packet having the flag is discarded in the final service 40 (e.g., service 40-5) of the service chain.

Then, the continuity checking apparatus 10 determines whether a test is successful using an arrival message transmitted from each service 40 (S8). For example, the continuity checking apparatus 10 considers a case in which a path of a service chain that is a continuity checking target, acquired from the service information acquired in S1, is service 40-1→service 40-5. In this case, the continuity checking apparatus 10 identifies a path of a continuity checking packet identified on the basis of a service 40 that is a transmission source of each arrival message and a timestamp value, and if the identified path is service 40-1→service 40-5, determines that the test is successful (each service 40 is chained as intended by an operator).

[Configuration]

Figure 3:
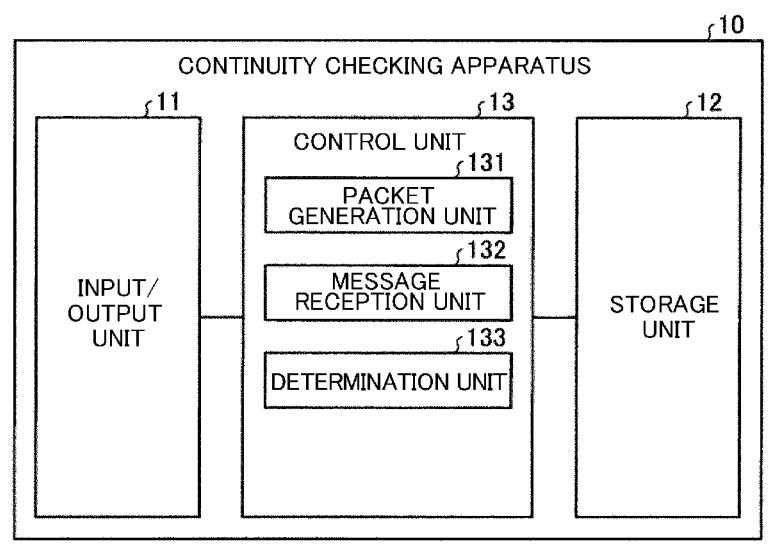
FIG. 3 is a diagram showing a configuration example of a continuity checking apparatus in the first embodiment.

Next, a configuration example of the continuity checking apparatus 10 will be described using FIG. 3. The continuity checking apparatus 10 includes, for example, an input/output unit 11, a storage unit 12, and a control unit 13, as shown in FIG. 3.

The input/output unit 11 is an interface for inputting/outputting various types of data through a network. For example, the input/output unit 11 is an interface for transmitting a continuity checking packet through an external network such as the Internet or receiving an arrival message and the like through a monitoring network.

The storage unit 12 stores various types of information referred to by the control unit 13 when executing various types of processing. The control unit 13 performs overall control of the continuity checking apparatus 10. The control unit 13 includes, for example, a packet generation unit 131, a message reception unit 132, and a determination unit 133.

The packet generation unit 131 generates a continuity checking packet to which a predetermined flag indicating the continuity checking packet and user attributes of a user of a service chain that is a checking target are assigned and transmits the continuity checking packet to the edge router 30.

For example, the packet generation unit 131 acquires the user attributes of the user and service information of the service chain that is the continuity checking target from the chaining controller 20. Then, the packet generation unit 131 generates a continuity checking packet to which the acquired user attributes and a predetermined flag are assigned and transmits the continuity checking packet to the edge router 30. Meanwhile, the aforementioned predetermined flag is assigned to an IP header region of the continuity checking packet, for example. Further, the packet generation unit 131 stores the service information (information representing services 40 in the service chain which will be passed through) of the service chain that is the continuity checking target, acquired from the chaining controller 20, in the storage unit 12.

The message reception unit 132 receives, from each service 40, information (e.g., arrival message) for notification of reception of the continuity checking packet in the corresponding service 40.

The determination unit 133 identifies a path indicating through which services 40 the continuity checking packet has passed on the basis of the information (e.g., arrival message) representing reception of the continuity checking packet, transmitted from each service 40. Then, the determination unit 133 determines whether the identified path is the same as the path of the service chain that is the continuity checking target.

For example, a case in which services 40 which will be passed through in the service chain, represented by the service information stored in the storage unit 12, are service 40-1→service 40-5 will be considered.

Here, when the message reception unit 132 receives an arrival message from the service 40-1 and an arrival message from the service 40-5, the determination unit 133 identifies the path of the continuity checking packet as service 40-1→service 40-5 on the basis of the service 40 that is a transmission source of each arrival message and a timestamp value. Since this path is the same as the path (service 40-1→service 40-5) of the service chain that is the continuity checking target, stored in the storage unit 12, the determination unit 133 determines that each service 40 is chained as intended by an operator. On the other hand, when the path identified by the determination unit 133 is not the same as the path (service 40-1→service 40-5) of the service chain that is the continuity checking target, stored in the storage unit 12, the determination unit 133 determines that each service 40 is not chained as intended by the operator. Then, the determination unit 133 outputs the determination result to the outside through the input/output unit 11, for example.

[Processing Procedure]

Figure 4:
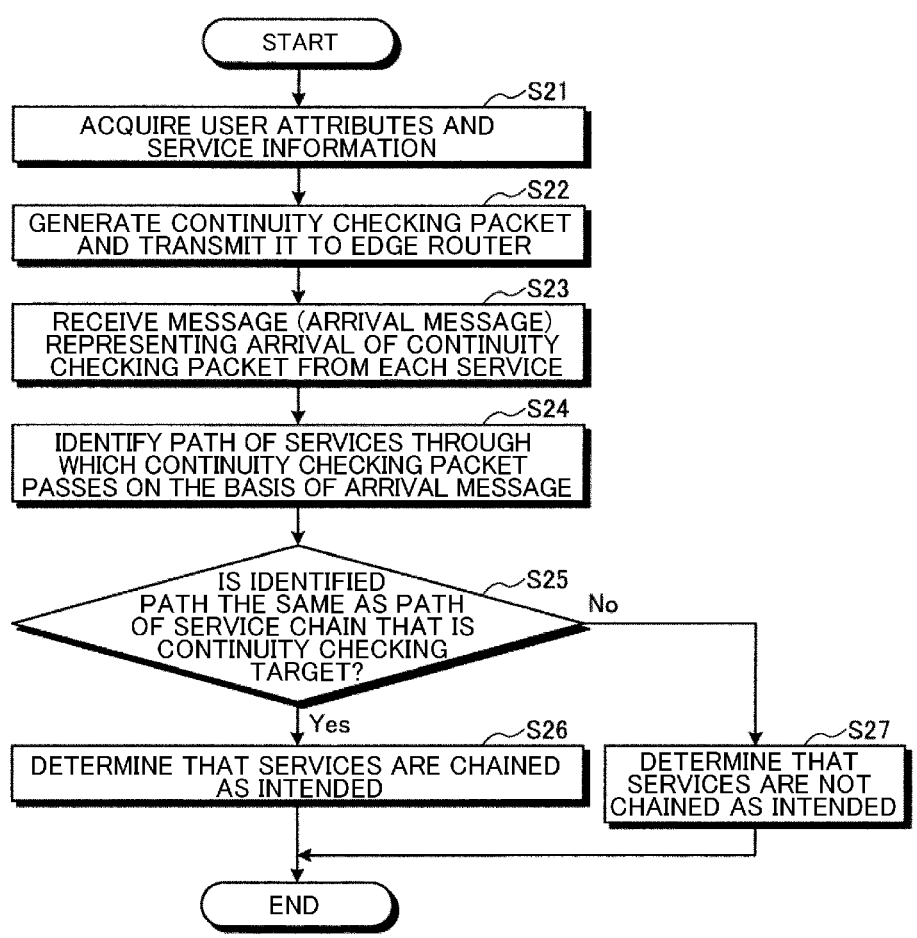
FIG. 4 is a flowchart showing an example of a processing procedure of the continuity checking apparatus in the first embodiment.

Next, an example of a processing procedure of the continuity checking apparatus 10 will be described using FIG. 4. First, the packet generation unit 131 of the continuity checking apparatus 10 acquires user attributes of a user and service information of a service chain that is a continuity checking target from the chaining controller 20 (S21). Then, the packet generation unit 131 generates a continuity checking packet to which the user attributes acquired in S21 and a predetermined flag are assigned and transmits the continuity checking packet to the edge router 30 (S22).

After S22, when the message reception unit 132 receives a message representing arrival of the continuity checking packet (arrival message) from each service 40 (S23), the determination unit 133 identifies a path of services through which the continuity checking packet has passed on the basis of the arrival messages received in S23 (S24).

Then, the determination unit 133 determines whether the path identified in S24 is the same as a path of the service chain that is the continuity checking target (S25). That is, the determination unit 133 determines whether the path identified in S24 is the same as a path of the service chain represented by the service information acquired in S21. Here, if the path identified in S24 is the same as the path of the service chain that is the continuity checking target (Yes in S25), the determination unit 133 determines that services are chained as intended by an operator (S26). On the other hand, if the path identified in S24 is not the same as the path of the service chain that is the continuity checking target (No in S25), the determination unit 133 determines that services are not chained as intended by an operator (S27).

In this manner, the continuity checking apparatus 10 can easily check whether each service 40 is chained as intended by an operator with respect to a dynamically formed service chain.

Second Embodiment

Next, a communication system of a second embodiment will be described using FIG. 5. The continuity checking apparatus 10 of the communication system of the second embodiment checks whether each service 40 is chained as intended by an operator by transmitting continuity checking packets in which different TTL values are set and checking a value of a packet counter that counts the continuity checking packets in each service 40.

For example, the continuity checking apparatus 10 transmits continuity checking packets to the edge router 30 while increasing a time to live (TTL) value from 1 to N (the number of services 40 constituting a service chain). The edge router 30 transfers a continuity checking packet group transmitted from the continuity checking apparatus 10 to the service 40 that is the entrance of the service chain. Then, each service 40 increments a packet counter value upon reception of a continuity checking packet.

Thereafter, the continuity checking apparatus 10 acquires a packet counter value of each service 40. Further, the continuity checking apparatus 10 identifies a continuity checking packet path from the acquired packet counter value of each service 40. Then, if the identified path is the same as a path of a service chain corresponding to user attributes, the continuity checking apparatus 10 determines that services are chained as intended by an operator.

An example of the communication system of the second embodiment will be described in detail using FIG. 5. Here, a case in which a path of a service chain that is a checking target is service 40-1→service 40-5 as in FIG. 2 is also exemplified.

First, the packet generation unit 131 of the continuity checking apparatus 10 acquires user attributes of a user and service information of the service chain that is the continuity checking target from the chaining controller 20 as in S1 of FIG. 2 (S11).

Then, the packet generation unit 131 generates a continuity checking packet to which the user attributes acquired in S11 and a predetermined flag are assigned and transmits the continuity checking packet to the edge router 30. Here, the packet generation unit 131 transmits the continuity checking packet to the edge router 30 while increasing a TTL value of the continuity checking packet from 1 to N that is the number of services constituting the service chain. For example, since the number of services 40 in the service chain that are the continuity checking targets is 2, the packet generation unit 131 generates packets (continuity checking packets) having TTL values of 1 and 2 and transmits the packets to the edge router 30 (S12).

Figure 5:
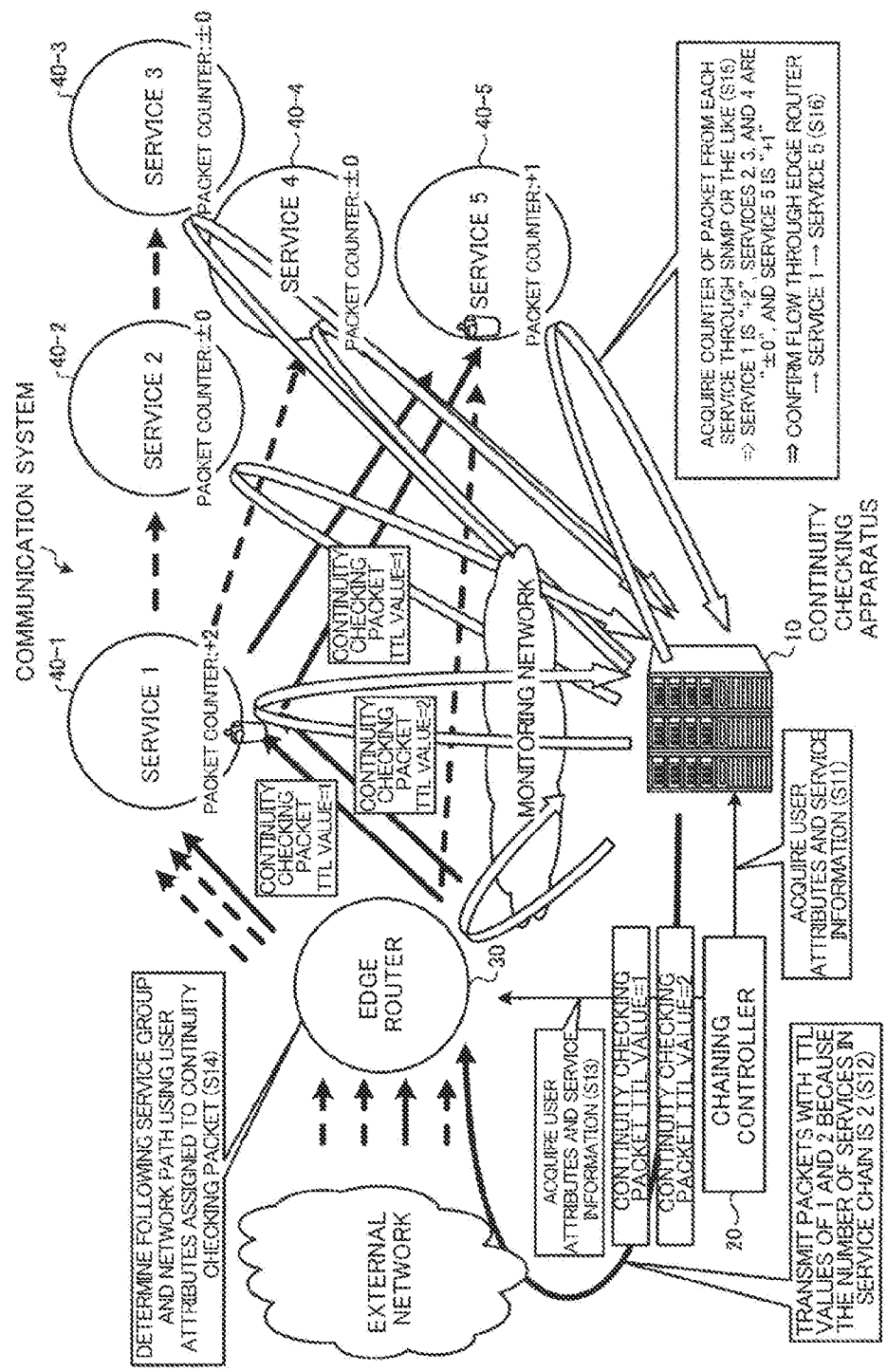
FIG. 5 is a diagram illustrating an operation example of a communication system in a second embodiment.

S13 to S15 of FIG. 5 are the same as S3 to S5 of FIG. 2 and thus description thereof is omitted. After S15, each service 40 increases a packet counter value by 1 upon reception of a continuity checking packet having a predetermined flag inserted thereinto. In addition, each service 40 decreases the TTL value of the received continuity checking packet by 1. Then, each service 40 transfers a continuity checking packet in which a decreased TTL value is equal to or greater than 1 to the next service 40 of the service chain.

For example, when the service 40-1 shown in FIG. 5 receives a continuity checking packet with a TTL value=1 and a continuity checking packet with a TTL value=2, a packet counter value is set to +2. Then, the service 40-1 decreases the TTL value of each continuity checking packet by 1. That is, the service 40-1 sets the TTL value of the continuity checking packet with a TTL value=1 to "0" and sets the TTL value of the continuity checking packet with a TTL value=2 to "1". Then, the service 40-1 discards the continuity checking packet having a TTL value of "0" and transfers the continuity checking packet having a TTL value of "1" to the next service 40-5 of the service chain.

Thereafter, when the service 40-5 receives the continuity checking packet with a TTL value=1, the service 40-5 sets a packet counter value to "+1". In addition, the service 40-5 sets the TTL value of the continuity checking packet with a TTL value=1 to "0". Then, the service 40-5 discards the continuity checking packet having a TTL value of "0". Meanwhile, since continuity checking packets have not arrived at services 40-2, 40-3 and 40-4, packet counter values are "±0".

Thereafter, the continuity checking apparatus 10 acquires a packet counter value from each service 40 through a simple network management protocol (SNMP) or the like (S15). For example, the message reception unit 132 of the continuity checking apparatus 10 acquires packet counter values from the services 40-1 to 40-5. As a result, the message reception unit 132 acquires information such as "+2" with respect to the service 40-1, "±0" with respect to the services 40-2, 40-3 and 40-4, and "+1" with respect to the service 40-5. Accordingly, the determination unit 133 of the continuity checking apparatus 10 can confirm that continuity checking packets have flowed through edge router 30→service 40-1 (packet counter value of "+2")→service 40-5 (packet counter value of "+1") (S16).

That is, since the path of service 40-1→service 40-5 is the same as the path (service 40-1→service 40-5) of the service chain that is the continuity checking target, stored in the storage unit 12, the determination unit 133 determines that each service 40 is chained as intended by the operator. On the other hand, if the path identified by the determination unit 133 on the basis of packet counter values acquired from the services 40-1 to 40-5 is not the same as the path (service 40-1→service 40-5) of the service chain that is the continuity checking target, stored in the storage unit 12, the determination unit 133 determines that each service 40 is not chained as intended by the operator.

Since the above-described continuity checking apparatus 10 checks a path of a continuity checking packet using the SNMP, it is not necessary to set an arrival message of the continuity checking packet such that it is transmitted to each service 40. Accordingly, the continuity checking apparatus 10 can more easily check whether each service 40 is chained as intended by the operator.

[Program]

In addition, a program for realizing functions of the continuity checking apparatus 10 described in the aforementioned embodiments can be implemented by being installed in a desired information processing apparatus (computer). For example, the information processing apparatus can be caused to serve as the continuity checking apparatus 10 by executing a program provided as package software or online software using the information processing apparatus. The information processing apparatus mentioned here includes a desktop type or notebook type personal computer, a rack mounting type server computer, and the like. In addition, a smartphone, mobile communication terminals such as a cellular phone and a personal handyphone system (PHS), a personal digital assistant (PDA), and the like are included in the category of the information processing apparatus. Further, the continuity checking apparatus 10 may be mounted in a cloud server.

Figure 6:
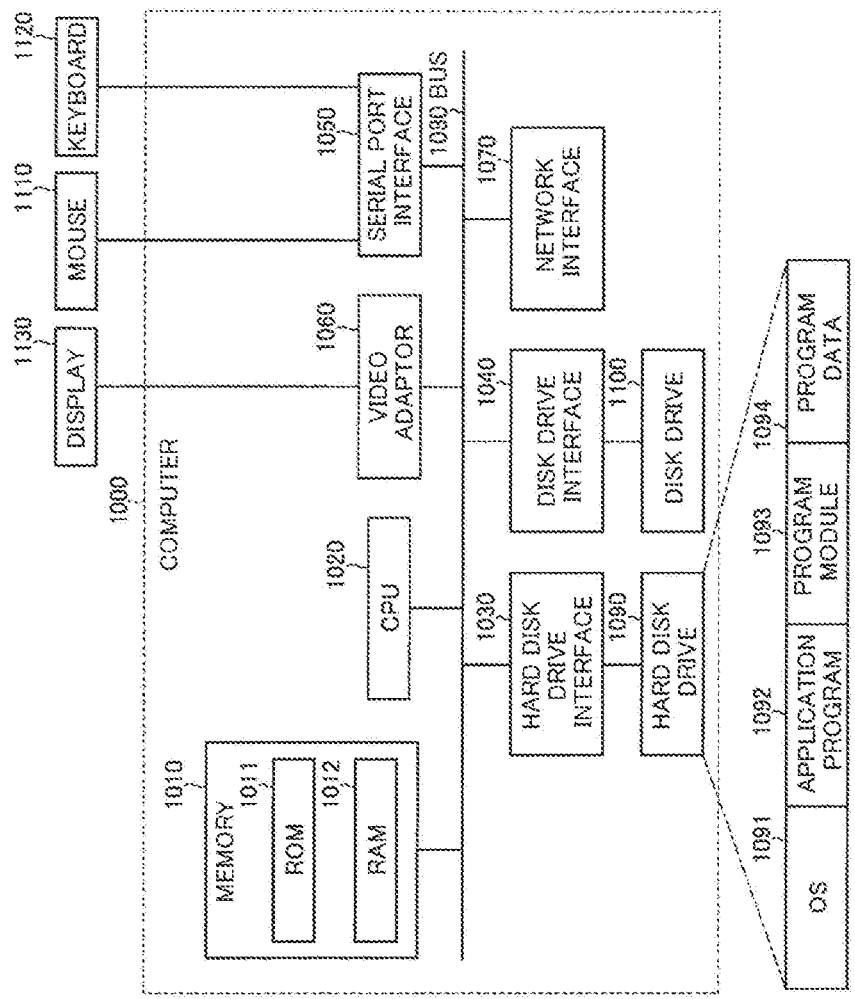
FIG. 6 is a diagram showing an example of a computer that executes a continuity checking program.

An example of a computer that executes the aforementioned continuity checking program will be described using FIG. 6. As shown in FIG. 6, the computer 1000 includes, for example, a memory 1010, a CPU 1020, a hard disk drive interface 1030, a disk drive interface 1040, a serial port interface 1050, a video adaptor 1060, and a network interface 1070. These components are connected through a bus 1080.

The memory 1010 includes a read only memory (ROM) 1011 and a random access memory (RAM) 1012. The ROM 1011 stores a boot program such as a basic input output system (BIOS), for example. The hard disk drive interface 1030 is connected to a hard disk drive 1090. The disk drive interface 1040 is connected to a disk drive 1100. For example, a detachable storage medium such as a magnetic disk or an optical disc is inserted into the disk drive 1100. For example, a mouse 1110 and a keyboard 1120 are connected to the serial port interface 1050. For example, a display 1130 is connected to the video adaptor 1060.

Here, the hard disk drive 1090 stores, for example, an OS 1091, an application program 1092, a program module 1093, and program data 1094, as shown in FIG. 6. Various types of data and information described in the aforementioned embodiments are stored, for example, in the hard disk drive 1090 and the memory 1010.

In addition, the CPU 1020 reads the program module 1093 and the program data 1094 stored in the hard disk drive 1090 to the RAM 1012 as necessary and executes each procedure described above.

Meanwhile, the program module 1093 and the program data 1094 pertaining to the program are not limited to cases in which they are stored in the hard disk drive 1090 and may be stored, for example, in a detachable storage medium and read by the CPU 1020 through the disk drive 1100 or the like. Alternatively, the program module 1093 and the program data 1094 pertaining to the program may be stored in another computer connected through a network such as a LAN, a wide area network (WAN), or the like and read by the CPU 1020 through the network interface 1070.

REFERENCE SIGNS LIST

10 Continuity checking apparatus
11 Input/output unit
12 Storage unit
13 Control unit
131 Packet generation unit
132 Message reception unit
133 Determination unit

The invention claimed is:

1. A communication system comprising: one or more service devices constituting a service chain; and a continuity checking apparatus which performs continuity checking of service devices constituting the service chain, wherein the continuity checking apparatus comprises: a packet generation unit, including one or more processors, configured to generate a continuity checking packet to which a predetermined flag and user attributes information of a user of the service chain that is a continuity checking target are assigned, and transmit the generated continuity checking packet to an edge router connected to a service device that is an entrance of the service chain; a message reception unit, including one or more processors, configured to receive information representing reception of the continuity checking packet from each service device constituting the service chain; and a determination unit, including one or more processors, configured to identify a path representing service devices through which the continuity checking packet passes on the basis of the information representing reception of the continuity checking packet, transmitted from each service device, and determine whether the identified path is the same as a path of the service chain that is the continuity checking target, and wherein the service device comprises: a message transmission unit, including one or more processors, configured to, upon reception of a continuity checking packet to which a predetermined flag is assigned, transmit information representing reception of the continuity checking packet to the continuity checking apparatus; and a transfer unit, including one or more processors, configured to transfer the continuity checking packet to a next service device of the service chain on the basis of user attributes information assigned to the received continuity checking packet;
wherein the service device further comprises a count unit, including one or more processors, configured to count the number of received continuity checking packets to which the predetermined flag is assigned, wherein, when a request for acquisition of information representing the number of received continuity checking packets is received through a simple network management protocol (SNMP), the message transmission unit is configured to transmit the information representing the number of received continuity checking packets in response to the request for acquisition, the transfer unit is configured to subtract 1 from time to live (TTL) values of the received continuity checking packets and, as a result of subtraction, transfer the continuity checking packet having a TTL value equal to or greater than 1 to the next service device of the service chain on the basis of the user attributes information assigned to the continuity checking packet, the packet generation unit of the continuity checking apparatus is configured to transmit the continuity checking packet to the edge router while increasing the TTL value of the continuity checking packet from 1 to the number of service devices constituting the service chain, the message reception unit is configured to acquire, from each service device, information representing the number of received continuity checking packets in the corresponding service device through the SNMP, and the determination unit is configured to identify a path representing service devices through which the continuity checking packet passes on the basis of the information representing the number of received continuity checking packets, transmitted from each service device, and determine whether the identified path is the same as the path of the service chain that is the continuity checking target.

2. The communication system according to claim 1, wherein the predetermined flag is assigned to an IP header region of the continuity checking packet.

3. A continuity checking method performed in a communication system including: one or more service devices constituting a service chain; and a continuity checking apparatus which performs continuity checking of the service chain, the continuity checking method comprising:
a step in which the continuity checking apparatus generates a continuity checking packet to which a predetermined flag and user attributes information of a user of the service chain that is a continuity checking target are assigned, and transmits the generated continuity checking packet to an edge router connected to a service device that is an entrance of the service chain; a step in which, when a continuity checking packet to which a predetermined flag is assigned is received, the service device transmits information representing reception of the continuity checking packet to the continuity checking apparatus; a step in which the service device transfers the continuity checking packet to a next service device of the service chain on the basis of user attributes information assigned to the received continuity checking packet; a step in which the continuity checking apparatus receives information representing reception of the continuity checking packet from each service device constituting the service chain; and a step in which the continuity checking apparatus identifies a path representing service devices through which the continuity checking packet passes on the basis of the information representing reception of the continuity checking packet, transmitted from each service device, and determines whether the identified path is the same as a path of the service chain that is the continuity checking target;
wherein the continuity checking method further comprises:
counting, by the service device, the number of received continuity checking packets to which the predetermined flag is assigned, wherein, when a request for acquisition of information representing the number of received continuity checking packets is received through a simple network management protocol (SNMP);

transmitting, by the service device, the information representing the number of received continuity checking packets in response to the request for acquisition;

subtracting, by the service device, 1 from time to live (TTL) values of the received continuity checking packets and, as a result of subtraction, transferring the continuity checking packet having a TTL value equal to or greater than 1 to the next service device of the service chain on the basis of the user attributes information assigned to the continuity checking packet, transmitting, by the continuity checking apparatus, the continuity checking packet to the edge router while increasing the TTL value of the continuity checking packet from 1 to the number of service devices constituting the service chain, acquiring, by the continuity checking apparatus from each service device, information representing the number of received continuity checking packets in the corresponding service device through the SNMP, and identifying, by the continuity checking apparatus, a path representing service devices through which the continuity checking packet passes on the basis of the information representing the number of received continuity checking packets, transmitted from each service device, and determining, by the continuity checking apparatus, whether the identified path is the same as the path of the service chain that is the continuity checking target.

4. The continuity checking method of claim 3, wherein the predetermined flag is assigned to an IP header region of the continuity checking packet.

* * * * *